(12) United States Patent  
Teramura et al.

(10) Patent No.: US 7,944,568 B2
(45) Date of Patent: May 17, 2011

(54) METHOD AND SYSTEM FOR PRODUCING TOMOGRAPHIC IMAGE BY OPTICAL TOMOGRAPHY WITH PROCESSING OF INTERFERENCE LIGHT SIGNALS

(75) Inventors: Yuichi Teramura, Ashigarakami-gun (JP); Satoshi Ozawa, Ashigarakami-gun (JP)

(73) Assignees: FUJIFILM Corporation, Tokyo (JP); Fujinon Corporation, Saitama-ken (JP)

( * ) Notice: Subject to any disclaimer, the term of this patent is extended or adjusted under 35 U.S.C. 154(b) by 211 days.

(21) Appl. No.: 12/342,618

(22) Filed: Dec. 23, 2008

(65) Prior Publication Data

US 2009/0168071 A1 Jul. 2, 2009

(30) Foreign Application Priority Data

Dec. 27, 2007 (JP) .................. 2007-336375

(51) Int. Cl.
*G01B 9/02* (2006.01)
(52) U.S. Cl. ....................................... 356/497
(58) Field of Classification Search ............. 356/479.497
See application file for complete search history.

(56) References Cited

U.S. PATENT DOCUMENTS 5,956,355 A * 9/1999 Swanson et al. ................ 372/20

FOREIGN PATENT DOCUMENTS

| JP | 2001-264246 A | 9/2001 |
| JP | 2004-344516 A | 12/2004 |
| JP | 2006-280449 A | 10/2006 |

* cited by examiner

*Primary Examiner* — Hwa S. A Lee
(74) *Attorney, Agent, or Firm* — Sughrue Mion, PLLC

(57) ABSTRACT

When reflection light, reflected from a measurement target that has been irradiated with measurement light in such a manner to scan the measurement target, and reference light are combined in each wavelength sweep, interference light is detected as interference signals. When a thinning region in which the interference signals obtained by detecting the interference light in each wavelength sweep are thinned so that the interference signals that are used to produce the tomographic image remain is set, thinning is performed on the plurality of interference signals in the thinning region. Light intensity information about the measurement target in the thinning region is obtained, based on the interference signals for the respective wavelength sweeps, the interference signals remaining after thinning. The tomographic image in the thinning region is produced based on the obtained light intensity information.

4 Claims, 9 Drawing Sheets

METHOD AND SYSTEM FOR PRODUCING TOMOGRAPHIC IMAGE BY OPTICAL TOMOGRAPHY WITH PROCESSING OF INTERFERENCE LIGHT SIGNALS

BACKGROUND OF THE INVENTION

1. Field of the Invention

The present invention relates to a method and a system for producing optical tomographic images by OCT (Optical Coherence Tomography) measurement.

2. Description of the Related Art

Conventionally, ultrasonic diagnostic apparatuses (ultrasonographs) have been used to observe lesions in the body cavities of patients. The ultrasonic diagnostic apparatuses obtain and display ultrasonic tomographic images of the lesions as motion images (video images). For example, in Japanese Unexamined Patent Publication No. 2004-344516, the entire area of an image represented by image data is divided into a plurality of areas, and the image data is updated for each of the divided areas to smoothly update the image.

Further, as a method for obtaining tomographic images of tissue in vivo (in living organisms), apparatuses for obtaining optical tomographic images are used, in some cases, in addition to the ultrasonic diagnostic apparatuses. The apparatuses for obtaining optical tomographic images obtain the optical tomographic images by utilizing OCT measurement. For example, Japanese Unexamined Patent Publication No. 2006-280449 proposes an image diagnostic apparatus that obtains an ultrasonic tomographic image and an optical tomographic image at the same time. In Japanese Unexamined Patent Publication No. 2006-280449, the optical tomographic image of only a region of interest (ROI), which is part of the entire image, is obtained, because production of the optical tomographic image requires long image processing time. In Japanese Unexamined Patent Publication No. 2006-280449, the optical tomographic images are obtained as stated above. Therefore, a drop in the frame rate is prevented when the ultrasonic tomographic image and the optical tomographic image are displayed at the same time.

Not only in the configuration disclosed in Japanese Unexamined Patent Publication No. 2006-280449, when the optical tomographic images are displayed as motion images by FD (Fourier Domain)-OCT measurement, it is necessary to obtain tomographic information by performing frequency analysis, such as Fourier transformation. Since the frequency analysis requires predetermined processing time, when a probe is rotationally driven by a user, the update of the tomographic images is delayed from the operation of the probe, in other words, the update of the tomographic images does not synchronize with the operation of the probe. Hence, there is a problem that the motion-image response characteristic of the tomographic images is low.

SUMMARY OF THE INVENTION

In view of the foregoing circumstances, it is an object of the present invention to provide a system for producing optical tomographic images that have a higher motion-image response characteristic, using a low-cost processing unit.

A method for producing a tomographic image according to the present invention is a method for producing a tomographic image by optical tomography, the method comprising the steps of:

outputting light, the wavelength of which is periodically swept;

dividing the output light into measurement light and reference light;

combining reflection light that is reflected from a measurement target when the measurement target is irradiated with the measurement light in such a manner to scan the measurement target and the reference light;

detecting, as interference signals, interference light when the reflection light and the reference light are combined in each wavelength sweep;

when a thinning region in which the interference signals that have been obtained by detecting the interference light in each wavelength sweep are thinned so that the interference signals that are used to produce the tomographic image remain has been set, thinning a plurality of interference signals obtained in the set thinning region;

obtaining, based on the interference signals for the respective wavelength sweeps, the interference signals remaining after the thinning, light intensity information about the measurement target in the thinning region; and producing the tomographic image in the thinning region based on the obtained light intensity information.

A system for producing a tomographic image according to the present invention is a system for producing a tomographic image by optical tomography, the system comprising:

a light source unit that outputs light, the wavelength of which is periodically swept;

a light division means that divides the light, which has been output from the light source unit, into measurement light and reference light;

a light combination means that combines reflection light that is reflected from a measurement target when the measurement target is irradiated with the measurement light, which has been obtained by dividing the light by the light division means, in such a manner to scan the measurement target and the reference light;

an interference light detection means that detects, as interference signals, interference light when the reflection light and the reference light are combined by the light combination means in each wavelength sweep;

a thinning region setting means that sets a thinning region in which the interference signals that have been obtained by the interference light detection means by detecting the interference light in each wavelength sweep are thinned so that the interference signals that are used to produce the tomographic image remain;

an interference signal thinning means that thins a plurality of interference signals obtained in the thinning region that has been set by the thinning region setting means;

a tomographic information obtainment means that obtains, based on the interference signals for the respective wavelength sweeps, the interference signals remaining after thinning by the interference signal thinning means, light intensity information about the measurement target in the thinning region; and a tomographic image production means that produces the tomographic image in the thinning region based on the light intensity information that has been obtained by the tomographic information obtainment means.

Here, the reflection light means light reflected from the measurement target and backscattered light.

Further, the thinning region setting means may set, as the thinning region, a specific region of the entire area scanned with the measurement light. Alternatively, the thinning region setting means may set, as the thinning region, the entire area scanned with the measurement light. Further, the thinning region setting means may have a mode in which no thinning region is set.

Further, in the thinning region, the tomographic information obtainment means should obtain the light intensity information based on an interference signal or signals selected by the interference signal thinning means. In a region other than the thinning region, the tomographic information obtainment means should obtain the light intensity information based on a plurality of interference signals that have not been thinned.

Further, a system for producing a tomographic image by optical tomography according to the present invention may further include a periodic clock generation means that outputs a periodic clock signal when a wavelength for one period has been swept by the light source unit. At this time, the interference signal thinning means may count the number of clocks of periodic clock signals output from the periodic clock generation means and thin the interference signals by selecting the interference signal when the number of the clocks obtained by counting reaches a predetermined clock number.

The predetermined clock number may be any number that is greater than or equal to two. Further, the predetermined clock number may be set by the user.

Further, the system for producing a tomographic image by optical tomography according to the present invention may further include a region division means that divides a region that is scanned with the measurement light into a plurality of divisional areas with respect to the direction of the scan. At this time, the tomographic information obtainment means may obtain the light intensity information for each of the divisional areas based on a plurality of interference signals in the divisional areas that have been set by the region division means. Further, the tomographic image production means may update the tomographic image based on the light intensity information for each of the divisional areas that has been obtained by the tomographic information obtainment means.

Further, a system for producing a tomographic image by optical tomography according to the present invention may further include a rotation clock generation means that outputs a rotation clock signal each time the measurement target is scanned once with the measurement light. At this time, the region division means may generate division clock signals that have periods of 1/M times (M is the number of the divisional areas) as long as the period of the rotation clock signal output from the rotation clock generation means, and divide, based on the division clock signals, the plurality of interference signals into groups for the respective divisional areas.

Further, the region division means may set a divisional area in which the tomographic image should be updated by selecting the divisional area from the plurality of divisional areas. Further, the tomographic information obtainment means may obtain the light intensity information based only on the interference signals in the divisional area. Further, the tomographic image production means may produce the tomographic image based only on the light intensity information about the divisional area.

According to a method and a system for producing a tomographic image by optical tomography of the present invention, light, the wavelength of which is periodically swept, is output. The output light is divided into measurement light and reference light. Reflection light that is reflected from a measurement target and the reference light are combined with each other when the measurement target is irradiated with the measurement light in such a manner to scan the measurement target. Interference light when the reflection light and the reference light are combined with each other is detected, as interference signals, in each wavelength sweep. When a thinning region has been set, thinning a plurality of interference signals obtained in the set thinning region. In the thinning region, the interference signals that have been obtained by detecting the interference light in each wavelength sweep are thinned so that the interference signals that are used to produce the tomographic image remain. Light intensity information about the measurement target in the thinning region is obtained based on the interference signals for the respective wavelength sweeps, the interference signals remaining after the thinning. The tomographic image in the thinning region is produced based on the obtained light intensity information. Accordingly, signal processing is performed on the interference signals after thinning. Hence, it is possible to reduce the data processing amount, thereby improving the motion-image response characteristic, using a low-cost processing unit.

Further, when the thinning region setting means has a function for setting, as the thinning region, a specific region of the entire area scanned with the measurement light, it is possible to improve the motion-image response characteristic by performing thinning in the region that is not the region of interest. At the same time, it is possible to obtain a tomographic image that has a high image quality in the region of interest.

Further, when a region division means that divides a region that is scanned with the measurement light into a plurality of divisional areas with respect to the direction of the scan is further provided, and the tomographic information obtainment means obtains, based on a plurality of interference signals in the divisional areas that have been set by the region division means, the light intensity information for each of the divisional areas, and the tomographic image production means updates the tomographic image based on the light intensity information for each of the divisional areas that has been obtained by the tomographic information obtainment means, it is possible to reduce a data processing amount that is required to update the displayed tomographic image. Further, it is possible to improve the motion-image response characteristic.

Further, when the region division means has a function for specifying a divisional area in which the tomographic image should be updated by selecting the divisional area, and the tomographic information obtainment means obtains the light intensity information based only on the interference signals in the specified divisional area, and the tomographic image production means updates the tomographic image based only on the light intensity information about the divisional area to be updated, it is possible to reduce a data processing amount by repeating update of only the tomographic image in the region of interest. Hence, it is possible to improve the motion-image response characteristic.

DESCRIPTION OF THE PREFERRED EMBODIMENTS

Figure 1:
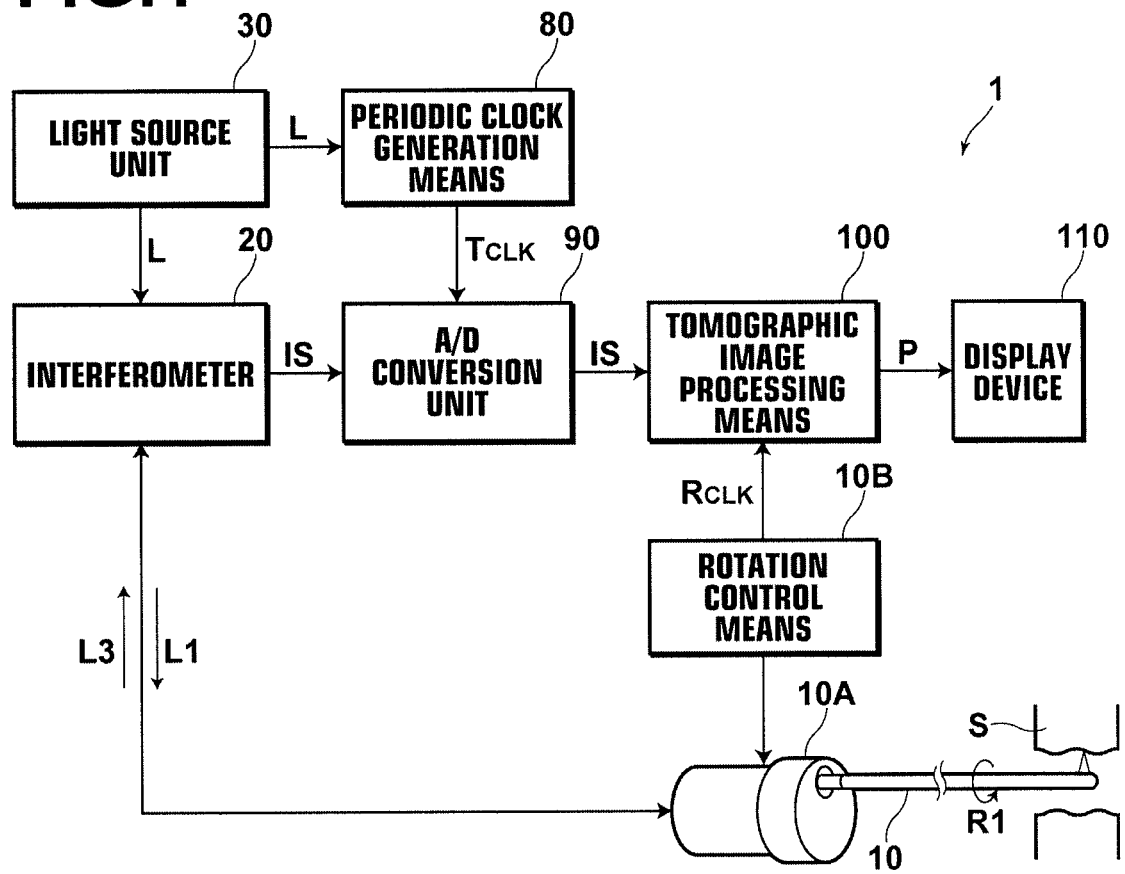
FIG. 1 is a schematic diagram illustrating the configuration of a system for producing tomographic images by optical tomography according to a preferred embodiment of the present invention.

Hereinafter, embodiments of a system for producing tomographic images by optical tomography according to the present invention will be described with reference to drawings. FIG. 1 is a schematic diagram illustrating the configuration of a system for producing tomographic images by optical tomography according to a preferred embodiment of the present invention. A system 1 for producing tomographic images by optical tomography obtains tomographic images of measurement target S, such as tissue or cells in the body cavities of living organisms (in vivo), by SS-OCT (Swept Source OCT) measurement by inserting an optical probe 10 into the body cavities. The system 1 for producing tomographic images by optical tomography includes the optical probe 10, an interferometer 20, a light source unit 30, a periodic clock generation means 80, an A/D (analog to digital) conversion unit 90, a tomographic image processing means 100, a display device 110 and the like.

Figure 2:
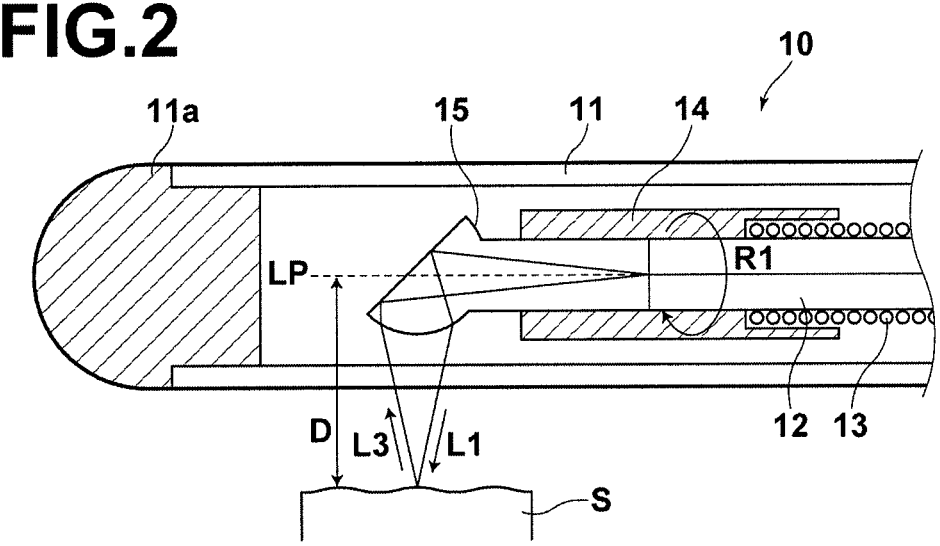
FIG. 2 is a schematic diagram illustrating an example of an optical probe that is used in the system for producing tomographic images by optical tomography illustrated in FIG. 1.

FIG. 2 is a schematic diagram illustrating an example of the tip of the optical probe 10, illustrated in FIG. 1. The optical probe 10 illustrated in FIG. 2 is inserted into the body cavity through a forceps opening, for example. The optical probe 10 includes a probe outer tube (sheath) 11, an optical fiber 12, an optical lens 15 and the like. The probe outer tube 11 is formed by a flexible cylindrical member. The flexible cylindrical member is made of a material that transmits measurement light L1 and reflection light L3. Further, the tip of the probe outer tube 11 is closed by a cap 11a.

The optical fiber 12 guides (directs) the measurement light L1 output from the interferometer 20 to the measurement target S. Further, the optical fiber 12 guides the reflection light L3 that is reflected from the measurement target S by irradiation with the measurement light L1 to the interferometer 20. The optical fiber 12 is housed within the probe outer tube 11.

Further, a spring 13 is fixed onto the outer circumference of the optical fiber 12. The optical fiber 12 and the spring 13 are mechanically connected to a rotational drive unit 10A. The optical fiber 12 and the spring 13 are rotated by the rotational drive unit 10A in the direction of arrow R1 with respect to the probe outer tube 11. Further, a rotation encoder (not illustrated) is provided for the rotational drive unit 10A, and a rotation-control means 10B recognizes, based on a signal output from the rotation encoder, the irradiation position of the measurement light L1.

The optical lens 15 has substantially spherical form to condense the measurement light L1 output from the optical fiber 12 onto the measurement target S. Further, the optical lens 15 condenses the reflection light L3 reflected from the measurement target S and causes the condensed light to enter the optical fiber 12. Here, the focal length of the optical lens 15 is, for example, at a position that is 3 mm (distance D=3 mm) away from the optical axis LP of the optical fiber 12 in the direction of the diameter of the probe outer tube. The optical lens 15 is fixed onto the light output end of the optical fiber 12 by using a fixing member 14. When the optical fiber 12 rotates in the direction of arrow R1, the optical lens 15 rotates in the direction of arrow R1 together with the optical fiber 12. Therefore, the optical probe 10 irradiates the measurement target S with the measurement light L1 output from the optical lens 15 in such a manner to scan the measurement target S in the direction of arrow R1 (the direction of the circumference of the probe outer tube 11).

The operation of the rotational drive unit 10A, illustrated in FIG. 1, which rotates the optical fiber 12 and the optical lens 15, is controlled by the rotation control means 10B. The rotation control means 10B controls the operation in such a manner that the optical fiber 12 and the optical lens 15 rotate in the direction of arrow R1 with respect to the probe outer tube 11, for example, at approximately 20 Hz. Further, the rotation control means 10B functions as a rotation clock generation means, which outputs a rotation clock signal $R_{CLK}$. The rotation control means 10B outputs the rotation clock signal $R_{CLK}$ when the rotation control means 10B judges, based on the signal output from the rotation encoder of the rotational drive unit 10A, that the optical fiber 12 has rotated once (one 360-degree turn).

Figure 3:
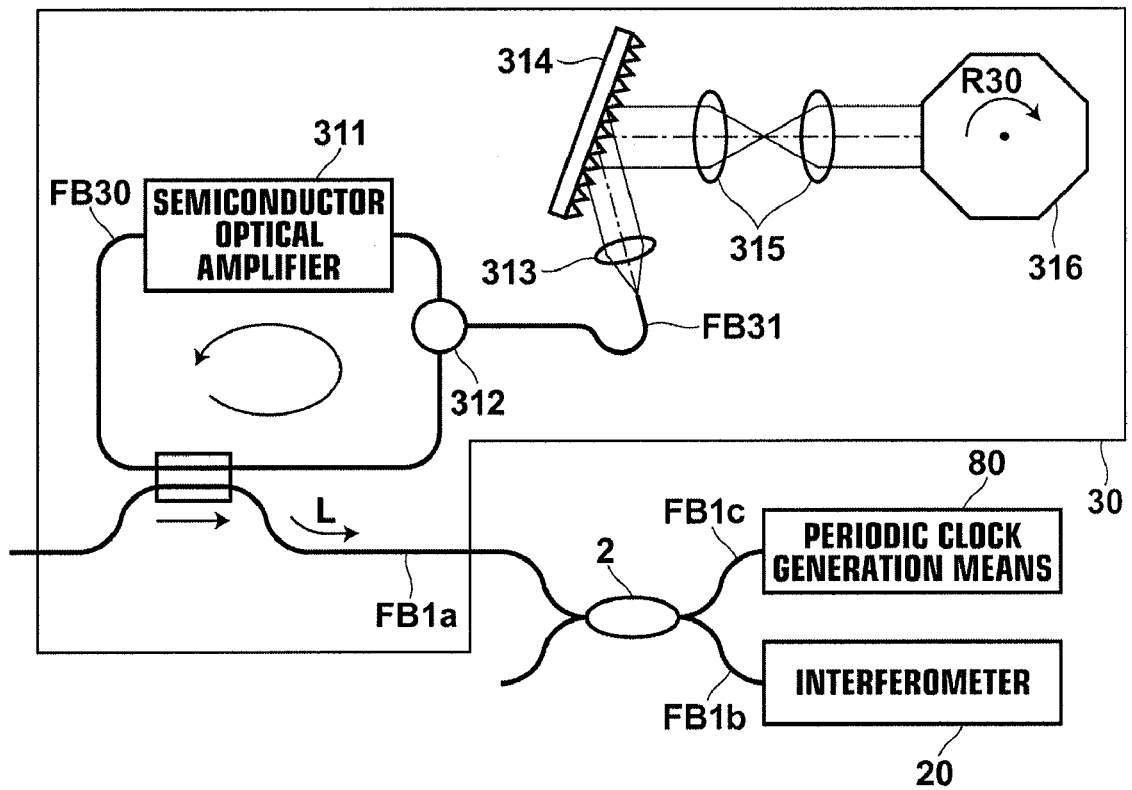
FIG. 3 is a schematic diagram illustrating an example of a light source unit in the system for producing tomographic images by optical tomography illustrated in FIG. 1.

FIG. 3 is a schematic diagram illustrating an example of the light source unit 30. The light source unit 30 outputs laser light L while the wavelength of the laser light L is swept in a constant period $T_0$. Specifically, the light source unit 30 includes a semiconductor optical amplifier (semiconductor gain medium) 311 and an optical fiber FB30. The optical fiber FB30 is connected to both ends of the semiconductor optical amplifier 311. The semiconductor optical amplifier 311 outputs faint light (very weak light) to one of the ends of the optical fiber FB30 when a drive current is injected into the semiconductor optical amplifier 311. Further, the semiconductor optical amplifier 311 amplifies light input thereto from the other end of the optical fiber FB30. When the drive current is supplied to the semiconductor optical amplifier 311, laser light L is output to the optical fiber FB30 by an optical resonator that is formed by the semiconductor optical amplifier 311 and the optical fiber FB30.

Further, the optical fiber FB30 is connected to an optical splitter 312, and part of the light transmitted through the optical fiber FB30 is output to the optical fiber FB31 through the optical splitter 312. Further, the light is output from the optical fiber FB31 and transmitted to a rotary polygon mirror (polygon mirror) 316 through a collimator lens 313, a diffraction grating element 314 and an optical system 315. Then, the light is reflected from the rotary polygon mirror 316, and reenters the optical fiber FB31 through the optical system 315, the diffraction grating element 314, and the collimator lens 313.

Here, the rotary polygon mirror 316 rotates in the direction of arrow R30, and the angle of each of the reflection planes of the rotary polygon mirror 316 changes with respect to the optical axis of the optical system 315. Accordingly, light only in a specific wavelength band of the light separated by the diffraction grating element 314 returns to the optical fiber FB31. The wavelength of the light that returns to the optical fiber FB31 is determined by the angle between the optical axis of the optical system 315 and each of the reflection planes. The light having the specific wavelength that has entered the optical fiber FB31 enters the optical fiber FB30 through the optical splitter 312. Further, the laser light L that has a specific wavelength is output to an optical fiber FB1$a$.

Figure 4:
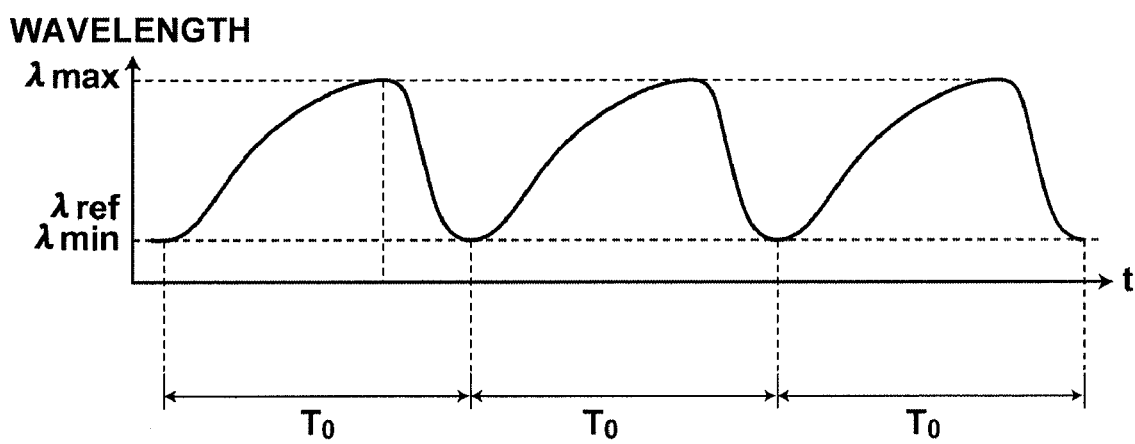
FIG. 4 is a graph showing a manner in which the wavelength of light to be output from the light source unit illustrated in FIG. 3 is swept.

Therefore, when the rotary polygon mirror 316 rotates at constant speed in the direction of arrow R30, the wavelength $\lambda$ of light that enters the optical fiber FB1$a$ periodically changes as time passes. Specifically, as illustrated in FIG. 4, the light source unit 30 outputs light L, the wavelength of which is swept in a constant period $T_0$ (for example, 50 μsec approximately) from the minimum sweep wavelength $\lambda$min to the maximum sweep wavelength $\lambda$max. The light L output from the light source unit 30 is split into optical fibers FB1$b$ and FB1$c$ by an optical splitting means 2 constituted of an optical fiber coupler or the like. Further, the light that has entered the optical fiber FB1$b$ through the optical fiber FB1$a$ and the light that has entered the optical fiber FB1$c$ enter the interferometer 20 and the periodic clock generation means 80, respectively.

A case in which the wavelength of light output from the light source unit 30 is swept by rotation of the polygon mirror has been described as an example. Alternatively, light may be output while the wavelength of the light is periodically swept by using a known technique, such as an ASE (amplified spontaneous emission) light source unit.

The periodic clock generation means 80 outputs a periodic clock signal $T_{CLK}$ when the wavelength of light output from the light source unit 30 is swept for one period. For example, the periodic clock generation means 80 detects a state in which the wavelength of the light output from the light source unit 30 becomes a set wavelength and outputs a periodic clock signal $T_{CLK}$. The timing of outputting the periodic clock signal $T_{CLK}$ may be set in various manners as long as the set wavelength is within the swept wavelength band. The periodic clock generation means 80 may set, as the wavelength for outputting the periodic clock signal $T_{CLK}$, a wavelength after completing a sweep or a wavelength immediately after starting a sweep. Alternatively, the periodic clock generation means 80 may set, as the wavelength for outputting the periodic clock signal $T_{CLK}$, a wavelength in the middle of the swept wavelength band. In FIG. 3, a case in which the periodic clock generation means 80 generates the period clock signal $T_{CLK}$ by detecting the light L output from the light source unit 30 has been described, as an example. Alternatively, the periodic clock signal $T_{CLK}$ may be output by detecting the angle of the rotary mirror at the light source unit 30.

Figure 5:
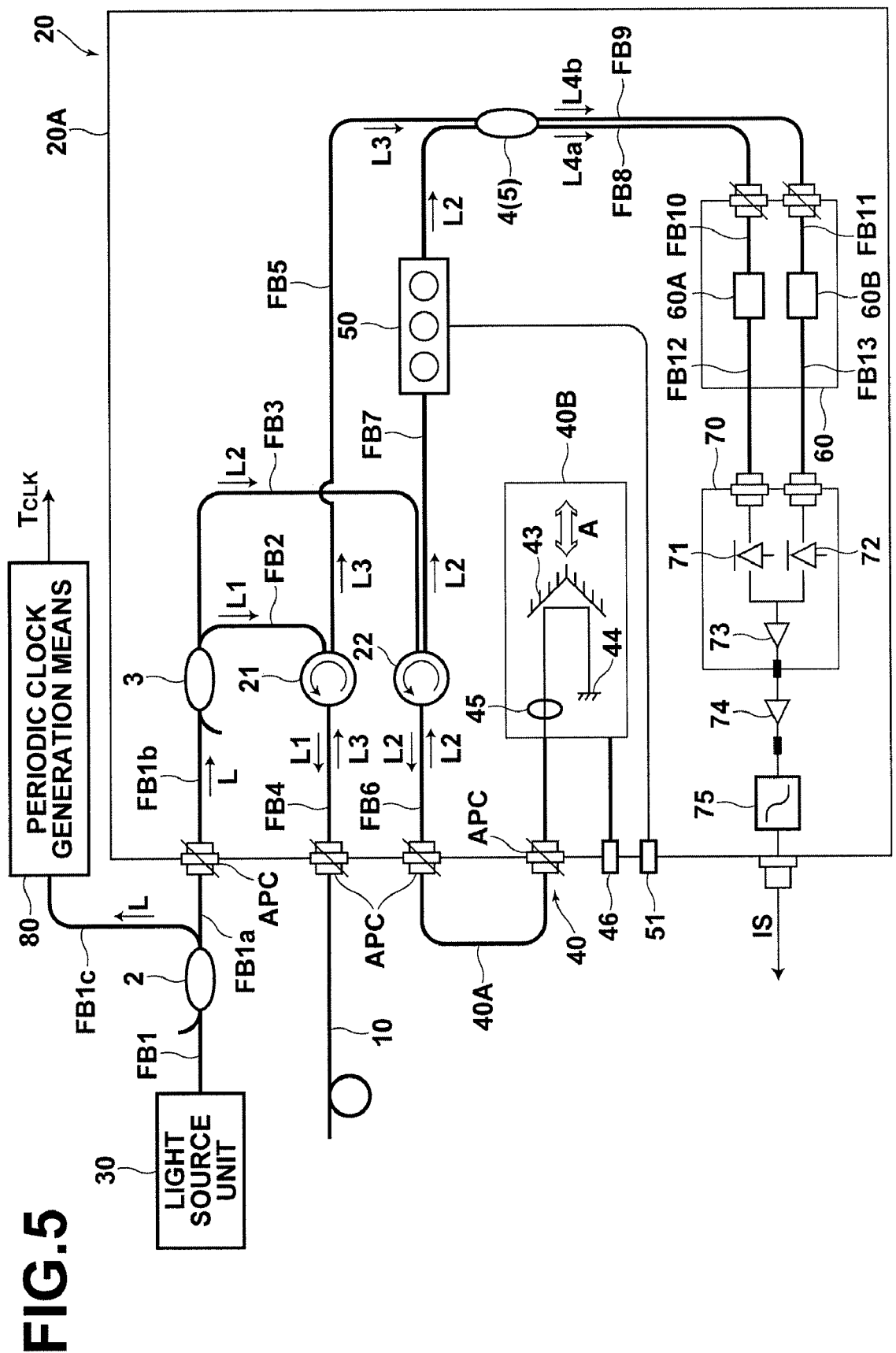
FIG. 5 is a schematic diagram illustrating an example of an interferometer in the system for producing tomographic images by optical tomography illustrated in FIG. 1.

FIG. 5 is a schematic diagram illustrating the configuration of an example of the interferometer 20 in the system 1 for producing tomographic images by optical tomography illustrated in FIG. 1. The interferometer 20 is a Mach-Zehnder interferometer, and includes various optical parts that are housed in a case 20A. The interferometer 20 includes a light division means 3, a light combination means 4, and an interference light detection means 70. The light division means 3 divides the light L output from the light source unit 30 into the measurement light L1 and the reference light L2. The light combination means 4 combines the reflection light L3 reflected from the measurement target S when the measurement target S is irradiated with the measurement light L1 that has been obtained by division by the light division means 3 and the reference light L2. The interference light detection means 70 detects interference light L4 between the reflection light L3 and the reference light L2 that have been combined by the light combination means 4. Further, the interferometer 20 and the light source unit 30 are connected to each other by an APC (Angled Physical Contact) connector. Since the APC connector is used, it is possible to minimize the reflection light returning from the connection end surface of the optical connector (optical fiber), thereby preventing deterioration in the image quality of a tomographic image P.

The light division means 3 is formed, for example, by a 2×2 optical fiber coupler. The light division means 3 divides the light that has been output from the light source unit 30 and transmitted through the optical fiber FB1$b$ into the measurement light L1 and the reference light L2. At this time, the light division means 3 divides the light, for example, at the ratio of measurement light L1:reference light L2=99:1. The light division means 3 is optically connected to the two optical fibers FB2 and FB3. The measurement light L1, which has been obtained by division, is input to the optical fiber FB2, and the reference light L2 is input to the optical fiber FB3.

The optical fiber FB2 is connected to an optical circulator 21. Further, the optical circulator 21 is connected to optical fibers FB4 and FB5. The optical fiber FB4 is connected to the optical probe 10, which directs the measurement light L1 to the measurement target S. The measurement light L1 output from the light division means 3 is transmitted from the optical fiber FB2 to the optical probe 10. Accordingly, the measurement target S is irradiated with the measurement light L1. Further, the reflection light L3 that has been reflected from the measurement target S is transmitted through the optical fiber FB4 and enters the optical circulator 21. Further, the reflection light L3 is output from the optical circulator 21 to the optical fiber FB5. Further, the optical fiber FB4 and the optical probe 10 are connected to each other by an APC (Angled Physical Contact) connector. Therefore, it is possible to minimize the reflection light returning from the connection end surface of the optical connector (optical fiber), thereby preventing deterioration in the image quality of a tomographic image P.

Meanwhile, the optical fiber FB3 is connected to an optical circulator 22. Further, the optical circulator 22 is connected to the optical fibers FB6 and FB7. The optical fiber FB6 is connected to an optical path length adjustment means 40 for changing the optical path length of the reference light L2 to adjust a region in which a tomographic image is obtained. The optical path length adjustment means 40 includes an optical fiber 40A for roughly adjusting an optical path length and an optical path length fine adjustment means 40B for finely adjusting the optical path length.

One of the ends of the optical fiber 40A for roughly adjusting the optical path length is detachably connected to the optical fiber FB6, and the other end of the optical fiber 40A for roughly adjusting the optical path length is detachably connected to the optical path length fine adjustment means 40B. As the optical fiber 40A for roughly adjusting the optical path length, a plurality optical fibers that have different lengths from each other may be prepared in advance. Then, the optical fiber 40A for roughly adjusting the optical path length that has an appropriate length may be selected and attached to be used. The optical fiber 40A for roughly adjusting the optical path length is connected to the optical fiber FB6 and optical path length fine adjustment means 40B by APC (Angled Physical Contact) connectors, respectively. Therefore, it is possible to minimize the reflection light returning from the connection end surface of the optical connector (optical fiber), thereby preventing deterioration in the image quality of a tomographic image P.

The optical path length fine adjustment means 40B includes a reflection mirror 43, an optical terminator 44 and the like. The reflection mirror 43 reflects the reference light L2 output from the optical fiber 40A for roughly adjusting the optical path length toward the optical terminator 44. Further, the reflection mirror 43 reflects the reference light L2 reflected from the optical terminator 44 toward the optical fiber 40A for roughly adjusting the optical path length again. The reflection mirror 43 is fixed onto a movable stage (not illustrated). The reflection mirror 43 is moved by a mirror movement means in the direction (the direction of arrow A) of the optical path of the reference light L2. Accordingly, the optical path length of the reference light L2 is changed. The movable stage moves the reflection mirror 43 in the direction of arrow A by operation of an optical path length adjustment operation unit 46.

Further, a polarization controller 50 is optically connected to the optical fiber FB7. The polarization controller 50 has a function for rotating the polarization direction of the reference light L2. As the polarization controller 50, a known technique, for example, disclosed in Japanese Unexamined Patent Publication No. 2001-264246 may be used. The polarization controller 50 adjusts the polarization direction when a polarization adjustment operation unit 51 is operated. For example, if the polarization adjustment operation unit 51 is operated so that the polarization direction of the reflection light L3 and that of the reference light L2 become the same when the reflection light L3 and the reference light L2 are combined by the light combination means 4, it is possible to obtain a sharp tomographic image.

The light combination means 4 is formed, for example, by a 2×2 optical fiber coupler. The light combination means 4 combines the reflection light L3 transmitted through the optical fiber FB5 and the reference light L2 transmitted through the optical fiber FB7. Specifically, the light combination means 4 splits the reflection light L3 transmitted through the optical fiber FB5 and causes the divided rays of light to enter two optical fibers, namely optical fibers FB8 and FB9, respectively. Further, the light combination means 4 splits the reference light L2 transmitted through the optical fiber FB7 and causes the divided rays of light to enter the optical fibers FB8 and FB9, respectively. Therefore, the reflection light L3 and the reference light L2 are combined with each other in each of the optical fibers FB8 and FB9. Hence, first interference light L4*a* is transmitted through the optical fiber FB8, and second interference light L4*b* is transmitted through the optical fiber FB9. Specifically, the light combination means 4 also functions as an optical splitting means 5 that splits the interference light L4 of the reflection light L3 and the reference light L2 into two rays of light, namely the interference light L4*a* and the interference light L4*b*.

The interference light detection means 70 includes a first photodetector 71, a second photodetector 72 and a differential amplifier 73. The first photodetector 71 detects the first interference light L4*a*. The second photodetector 72 detects the second interference light L4*b*. The differential amplifier 73 outputs, as an interference signal IS, a difference between the first interference light L4*a* detected by the first photodetector 71 and the second interference light L4*b* detected by the second photodetector 72. The photodetectors 71 and 72 are made of photodiodes or the like, for example. The photodetectors 71 and 72 perform photoelectric conversion on the interference light L4*a* and L4*b*, respectively, and input the converted light into the differential amplifier 73. The differential amplifier 73 amplifies the difference between the interference light L4*a* and the interference light L4*b* and outputs the amplified signal as the interference signal IS. As described above, balanced detection of the interference light L4*a* and the interference light L4*b* by use of the differential amplifier 73 is performed. Therefore, it is possible to amplify the interference signal IS and to output the amplified interference signal IS while same-phase optical noises, other than the interference signal IS, are removed. Hence, it is possible to improve the image quality of the tomographic image P.

Further, the interference signal IS output from the interference light detection means 70 is amplified by an amplifier 74 and output to an A/D conversion unit 90 through a signal band filter 75. Since the signal band filter 75 is provided, it is possible to remove noise from the interference signal IS, thereby improving the S/N ratio.

Figure 6:
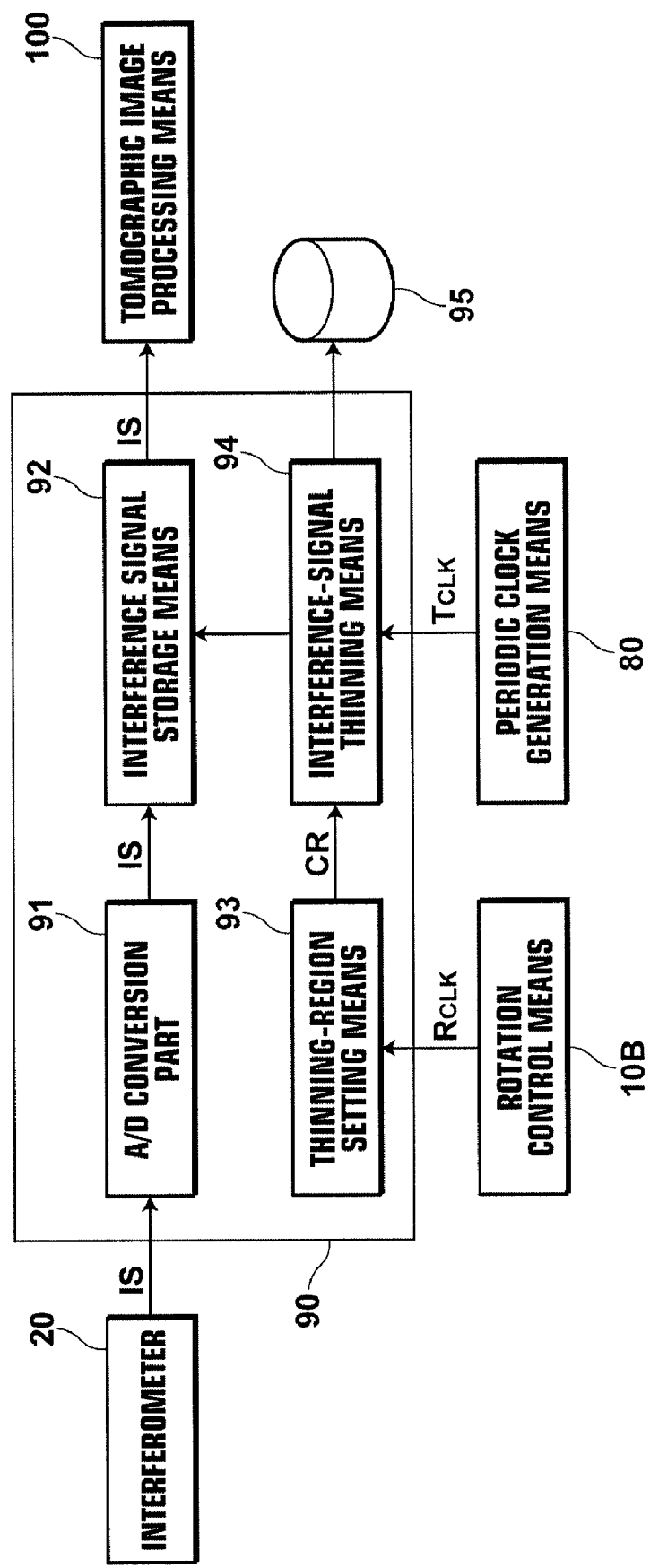
FIG. 6 is a block diagram illustrating an example of an A/D (analog to digital) conversion unit in the system for producing tomographic images by optical tomography illustrated in FIG. 1.

FIG. 6 is a block diagram illustrating an example of the A/D conversion unit 90 illustrated in FIG. 1. The A/D conversion unit 90 converts the interference signal IS detected by the interference light detection means 70 into a digital signal and outputs the digital signal. The A/D conversion unit 90 includes an A/D conversion part 91, an interference signal storage means 92, a thinning-region setting means 93, and an interference signal thinning means 94. The A/D conversion part 91 converts the interference signal IS that is output, as an analog signal, from the interferometer 20 into a digital signal. The interference signal IS after the A/D conversion is temporarily stored in the interference signal storage means 92, such as a RAM (random-access memory). Here, when the timing of outputting the periodic clock signal $T_{CLK}$ is time when the light L in the middle of the swept wavelength band is output, interference signals IS before and after the timing at which the periodic clock signal $T_{CLK}$ is output are stored, as interference signals S for one wavelength sweep, in the interference signal storage means 92. When the timing of outputting the periodic clock signal $T_{CLK}$ is immediately after completing a sweep or immediately before starting a sweep, interference signals IS that are stored before the output timing of the periodic clock signal $T_{CLK}$ are stored, as interference signals IS for one line, in the interference signal storage means 92.

Figure 7:
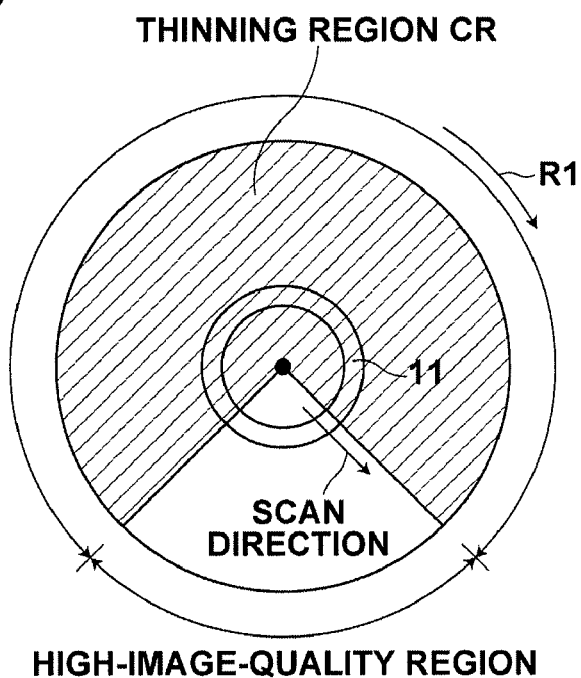
FIG. 7 is a schematic diagram illustrating an example of a thinning region that is set by a thinning region setting means illustrated in FIG. 6.

The thinning region setting means 93 sets a thinning region CR in which the interference signals IS obtained by detection in each wavelength sweep are thinned so that interference signals IS that are used to produce a tomographic image P remain. For example, as illustrated in FIG. 7, the thinning region setting means 93 sets, as the thinning region CR, a specific area of the scanned region. The thinning region setting means 93 sets the specific area of the scanned region based on an instruction input at an input unit (not illustrated), for example. It is not necessary that the thinning region setting means 93 sets the specific area of the scanned region as the thinning region. Instead, the thinning region setting means 93 may be set in an improved response-speed mode in which the interference signals IS are thinned in the entire region scanned with the measurement light L1 without specifying any specific area. Alternatively, the thinning region setting means 93 may be set in a high image-quality mode, in which thinning is not performed in any area of the scanned region.

The interference signal thinning means 94 illustrated in FIG. 6 thins the plurality of interference signals IS obtained in the thinning region CR that has been set by the thinning region setting means 93. Specifically, the interference signal thinning means 94 counts the number of clocks of the period clock signal $T_{CLK}$ and selects an interference signal IS when the counted clock number has reached a set clock number Tref that has been set in advance. The set clock number Tref may be set in advance. Alternatively, the set clock number Tref may be set based on an input from the input unit.

Figure 8:
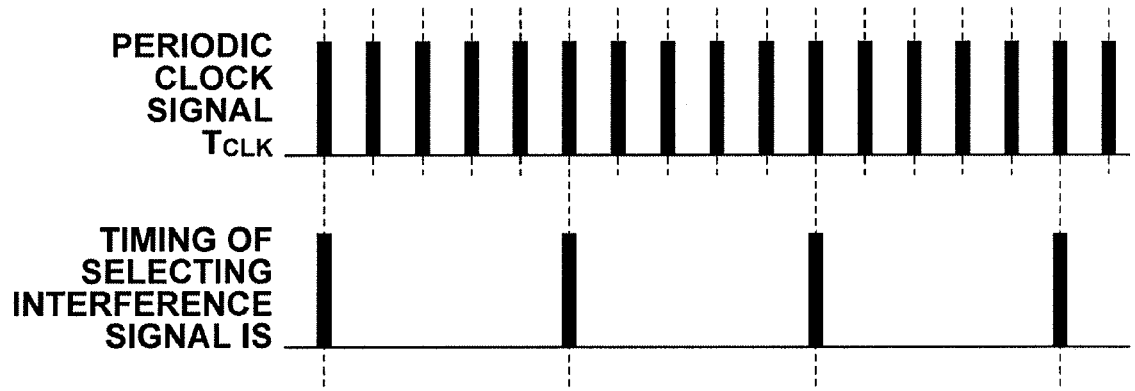
FIG. 8 is a timing chart illustrating a manner in which interference signals are thinned by an interference signal thinning means.

FIG. 8 is a timing chart illustrating a manner in which the interference signals IS are thinned by the interference signal thinning means 94 in the thinning region CR. In FIG. 7, the set clock number Tref is five (set clock number Tref=5), and the interference signal thinning means 94 selects an interference signal IS when the periodic clock signal $T_{CLK}$ for five clocks is output. Therefore, when the entire scanned region (the entire wavelength sweep range=2000 lines) is set as the thinning region CR, one tomographic image P is produced by wavelength sweep (interference signals IS) of 400 lines (2000 lines/5=400 lines).

Figure 9:
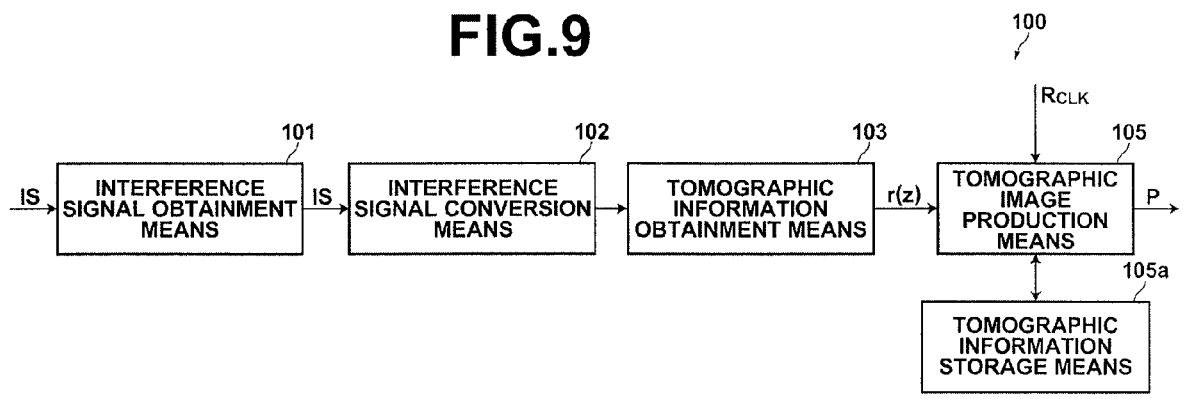
FIG. 9 is a block diagram illustrating an example of a tomographic image processing means illustrated in FIG. 1.

Further, the interference signals IS stored in the interference signal storage means 92 for one tomographic image P are output to the tomographic image processing means 100 when the rotation clock signal $R_{CLK}$ is output. All of the interference signals IS detected by the interference light detection means 70 are stored in a separate interference signal database 95. Therefore, after the measurement target S is observed in real time, it is possible to produce a tomographic image P that has a high image quality;

FIG. 9 is a block diagram illustrating an example of the tomographic image processing means 100. The configuration of the tomographic image processing means 100, as illustrated in FIG. 9, is realized by causing a computer (for example, a personal computer) to execute a tomographic image processing program installed in a supplementary storage apparatus. The tomographic image processing means 100 includes an interference signal obtainment means 101, an interference signal conversion means 102, a tomographic information obtainment means 103, a tomographic image production means 105 and the like.

Figure 10:
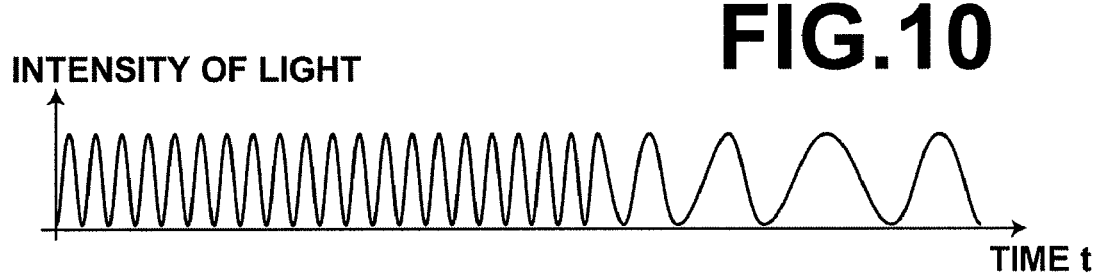
FIG. 10 is a graph showing an example of interference signals input to an interference signal conversion means illustrated in FIG. 9.
Figure 11:
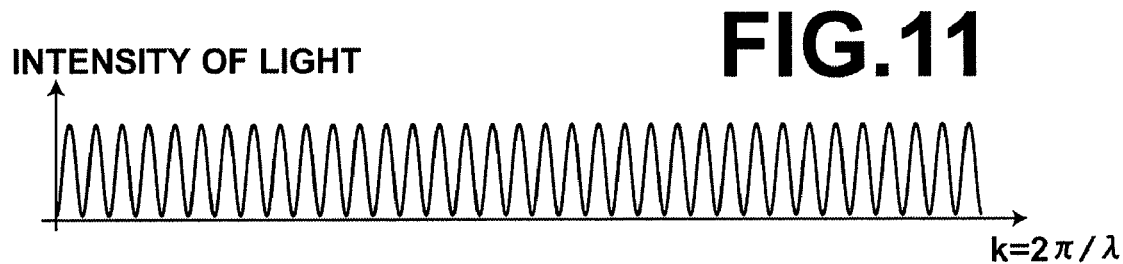
FIG. 11 is a graph showing an example of interference signals on which signal conversion has been performed by the interference signal conversion means illustrated in FIG. 9.

The interference signal obtainment means 101 obtains a plurality of interference signals IS selected by the interference signal thinning means 94 from the interference signal storage means 92. The interference signal conversion means 102 has a function for rearranging the interference signals IS, illustrated in FIG. 10, which are obtained at the A/D conversion unit 90 as time passes. The interference signals IS are rearranged at regular intervals with respect to the axis of the number k of waves ($=2\pi/\lambda$), as illustrated in FIG. 11. At this time, the interference signal conversion means 102 has a time-wavelength sweep characteristic data table or function about the light source unit 30 in advance. Therefore, the interference signal conversion means 102 rearranges the interference signals IS, based on the time-wavelength sweep characteristic data table or the like, in such a manner that the signals are arranged at regular intervals with respect to the axis of the number k of waves. Accordingly, when the light intensity information r(z) is calculated from the interference signals IS, a spectral analysis method, such as the Fourier transformation method or the maximum entropy method, can be used and highly accurate light intensity information r(z) can be obtained. These spectral analysis methods require the regular-interval arrangement of the signals in the frequency space to carry out the analysis. The detail of this signal conversion technique is disclosed in the specification of U.S. Pat. No. 5,956,355.

The tomographic information obtainment means 103 analyzes the interference signals IS for each wavelength sweep after the signal conversion by the interference signal conversion means 102, for example, by using a known spectral analysis technique, such as the Fourier transformation, the maximum entropy method (MEM), and the Yule-Walker method. Consequently, the tomographic information obtainment means 103 obtains light intensity information r(z) that depends on distance z in the direction of the optical axis.

Figure 12:
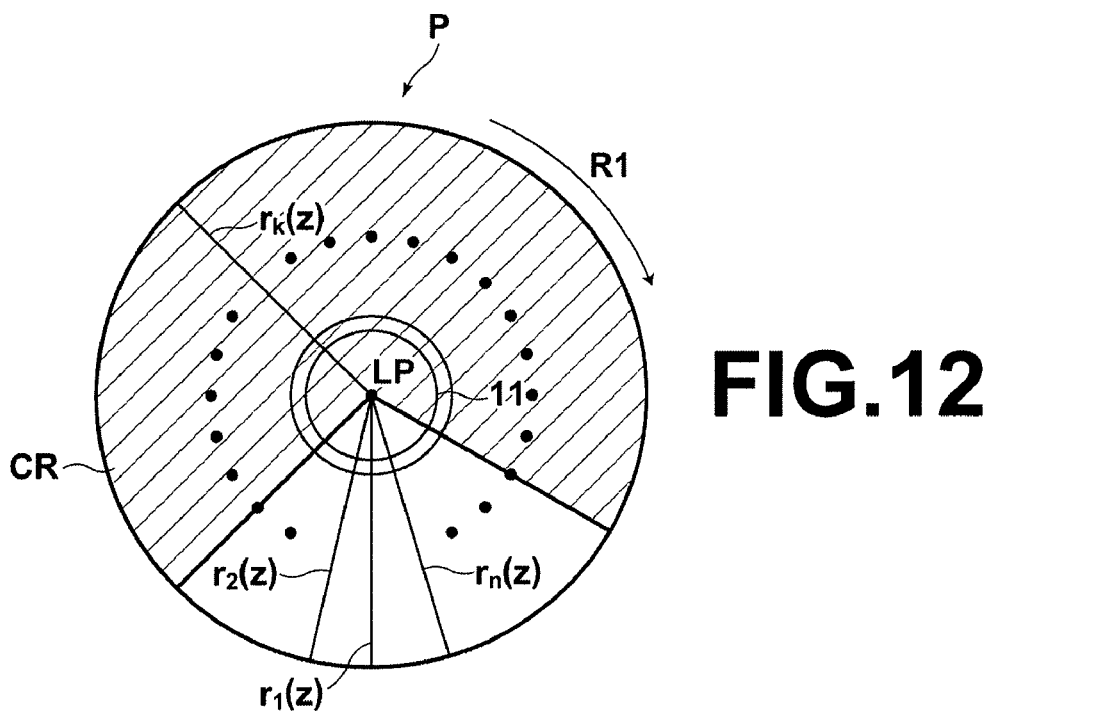
FIG. 12 is a schematic diagram illustrating an example of a tomographic image produced by a tomographic image production means illustrated in FIG. 9.

The tomographic image production means 105 obtains the light intensity information r(z) for one period (for one line) obtained by the tomographic information obtainment means 103. The light intensity information r(z) is obtained with respect to the radial direction (the direction of arrow R1) of the optical probe 10. Consequently, the two-dimensional distribution of the intensities of the reflection light, which includes the propagation direction of light as illustrated in FIG. 12, is produced. In other words, a tomographic image P is produced. Here, the tomographic image production means 105 stores the light intensity information r(z) for one line, which is sequentially obtained, in the tomographic information storage means 105a. When a rotation clock signal $R_{CLK}$ is output from the rotation control means 10B illustrated in FIG. 1, the tomographic image production means 105 produces a two-dimensional tomographic image P by arranging the light intensity information r(z) for a thinned wavelength sweep number. For example, when the periodic clock signal $T_{CLK}$ from the light source unit 30 is 20 kHz, and the optical probe 10 outputs the measurement light L1 at 20 Hz in such a manner to scan the measurement target in the direction of arrow R1, and the thinning region setting means 93 sets the entire scan region as the thinning region CR, and the interference signal thinning means 94 thins the interference signals IS in such a manner that the interference signals IS are reduced to ⅕, the tomographic image production means 105 produces one tomographic image P based on the light intensity information r(z) for 400 lines (n=2000/5=400 lines).

As described above, the interference signals IS are thinned, and tomographic image processing is performed on the thinned interference signals to display a tomographic image. Therefore, it is possible to greatly reduce image processing time, compared with the conventional method in which when a single tomographic image P (for one rotation scan) is obtained and displayed on the display device 110, tomographic image processing is performed on all of the interference signals IS obtained by wavelength sweep for the single image. Hence, it is possible to improve the motion-image response characteristic.

Next, with reference to FIGS. 1 through 12, a method for producing a tomographic image by optical tomography will be described. First, the light source unit 30 outputs light L, the wavelength of which is periodically swept in a predetermined wavelength band. The light L is divided into two by the light splitting means 2. The divided rays of light enter the interferometer 20 and the periodic clock generation means 80, respectively. Further, the light division means 3 in the interferometer 20 divides the light L into measurement light L1 and reference light L2. The measurement light L1 is output to the optical fiber FB2 and the reference light L2 is output to the optical fiber FB3.

The measurement light L1 is guided through the optical circulator 21, the optical fiber FB4 and the optical probe 10 and irradiates the measurement target S. Then, reflection light L3 reflected from the measurement target S and the backscattered light reenter the optical probe 10. The reflection light L3 is transmitted through the optical probe 10, the optical circulator 21 and the optical fiber FB5 and enters the light combination means 4.

Meanwhile, the reference light L2 is transmitted through the optical fiber FB3, the optical circulator 22 and the optical fiber FB6 and enters the optical path length adjustment means 40. The optical path length of the reference light L2 is adjusted by the optical path length adjustment means 40, and the reference light L2 is transmitted through the optical fiber FB6, the optical circulator 22, the polarization controller 50 and the optical fiber FB7 again and enters the light combination means 4.

The light combination means 4 combines the reflection light L3 and the reference light L2. Further, the light combination means 4 (light splitting means 5) divides the combined interference light L4 into interference light L4a and interference light L4b. The interference light L4a and the interference light L4b are output to the optical fibers FB8 and FB9, respectively. Further, balanced detection is performed on the interference light L4a and the interference light L4b that have been transmitted through the optical fibers FB8 and FB9, respectively, by the interference light detection means 70, and detected signals are output as interference signals IS. The interference signals IS are transmitted through the amplifier 74 and the signal band filter 75, and output to the A/D conversion unit 90.

After then, the A/D conversion unit 90 performs A/D conversion on the interference signals IS, and the converted signals are sequentially stored in the interference signal storage means 92. At this time, the interference signal thinning means 94 thins the interference signals IS in the thinning region CR that has been set by the thinning region setting means 93. Then, a plurality of interference signals IS after thinning are output to the tomographic image processing means 100.

In the tomographic image processing means 100, the interference signal conversion means 102 performs signal conversion processing on the interference signals IS so that the interference signals IS for one line are arranged at regular intervals with respect to the number k of waves. After then, the tomographic information obtainment means 103 performs spectral analysis on the interference signals IS, and obtains, as the light intensity information $r(z)$, the light intensity information (reflectance) based on each of the interference signals IS. Further, the tomographic image production means 105 stores the light intensity information $r(z)$ only about the interference signals IS for wavelength sweep remaining after thinning with respect to the scan direction (direction of arrow R1) of the measurement light L1. When a rotation clock signal $R_{CLK}$ is detected, one tomographic image P is produced/updated based on the plurality of pieces of light intensity information $r(z)$ that have been stored. Then, the tomographic image P is displayed on the display device 110 illustrated in FIG. 1. The update of the tomographic image P based on the thinned interference signals IS is repeatedly until an instruction to stop display of the tomographic image P is input.

When the light intensity information $r(z)$ is obtained from the interference signals IS, if the number of pieces from which the light intensity information $r(z)$ is obtained is reduced by thinning the interference signals IS, as described above, it is possible to improve the motion-image response characteristic of the tomographic image P. Specifically, in the conventional method, all of the interference signals IS for a single tomographic image P are temporarily stored in the interference signal storage means 92, and the interference signal obtainment means 101 obtains the interference signals IS for the single tomographic image P based on the output of the rotation clock signal $R_{CLK}$. For example, when the wavelength sweep frequency is 20 kHz, and the frequency of rotational scan is 10 Hz, and the number of pieces of data for one wavelength sweep is 1024, approximately 500 ms is required to perform processing from obtainment of the interference signals IS to display of the tomographic image P, which includes data transfer of the interference signals IS to the tomographic image processing means 100, obtainment of the light intensity information $r(z)$, and radial image transformation of the light intensity information $r(z)$. Specifically, even if the probe is rotationally driven at 10 Hz, the frame rate of the tomographic image P that is displayed as a motion image is only approximately 2 Hz.

Meanwhile, when the interference signals IS have been thinned by the interference signal thinning means 94 in such a manner that only ⅕ of the interference signals IS remain, for example (please refer to FIG. 8), time required to perform the processing from the obtainment of the interference signals IS to the display of the tomographic image P is approximately ⅕ of the time required when thinning has not been performed. Therefore, it is possible to display the tomographic image P in such a manner to follow the rotational drive of the optical probe.

Figure 13:
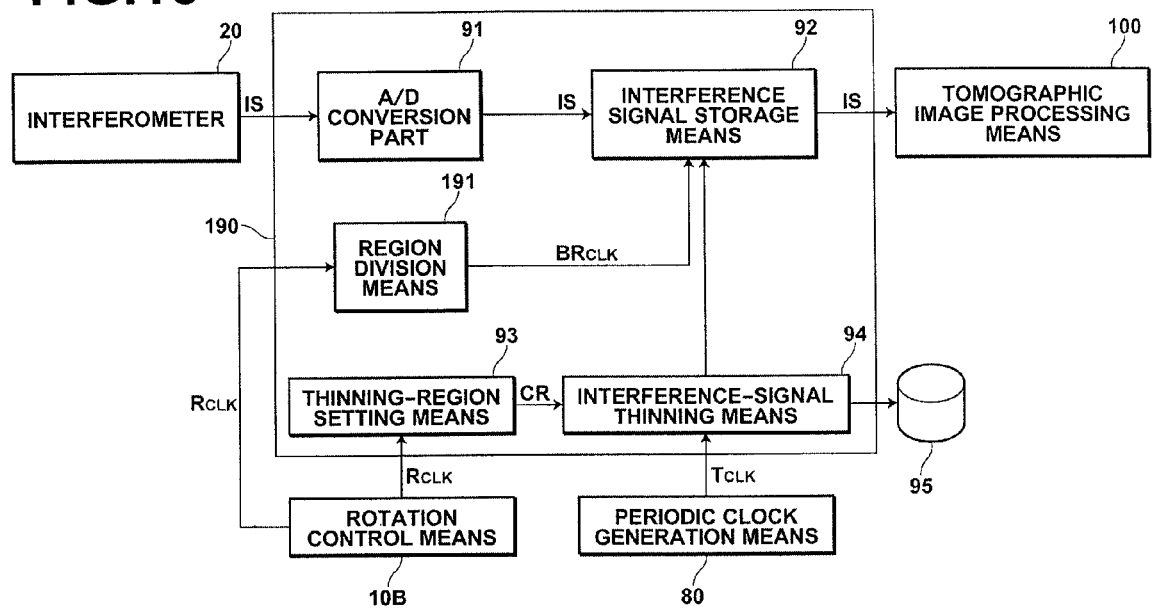
FIG. 13 a block diagram illustrating another example of the A/D conversion unit in the system for producing tomographic images by optical tomography of the present invention.

FIG. 13 is a block diagram illustrating another example of the A/D conversion unit in the system for producing optical tomographic images of the present invention. An A/D conversion unit 190 will be described with reference to FIG. 13. In the A/D conversion unit 190, illustrated in FIG. 13, the same reference numerals will be assigned to elements that are the same as those of the A/D conversion unit 90, illustrated in FIG. 6, and the explanation thereof will be omitted. The A/D conversion unit 190, illustrated in FIG. 13, differs from the A/D conversion unit 90, illustrated in FIG. 6, in that a region division means 191 is provided in the A/C conversion unit 190. The region division means 191 performs region division on the entire region scanned with the measurement light L1 to update the tomographic image P, area by area, for each of divisional areas BR.

Figure 14:
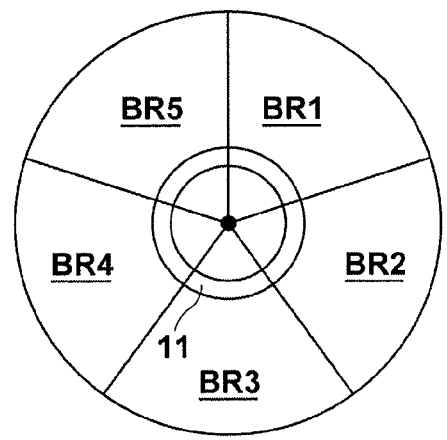
FIG. 14 is a schematic diagram illustrating a state in which a scan area (tomographic image) is divided into divisional areas by a region division means illustrated in FIG. 13.
Figure 15:
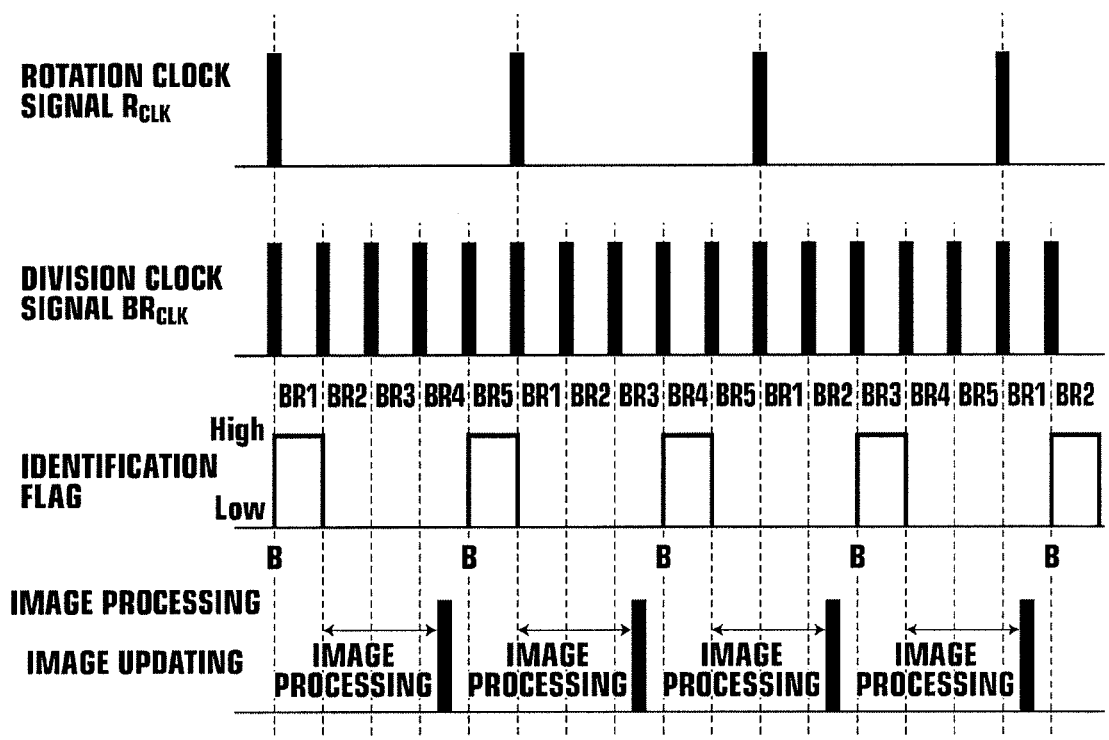
FIG. 15 is a timing chart illustrating a manner in which interference signals are divided into respective divisional areas by the region division means illustrated in FIG. 14.

The region division means 191 divides the entire scan region (a single tomographic image P) into a plurality of divisional areas BR with respect to the scan direction R1. For example, as illustrated in FIG. 14, a single tomographic image P is divided into five divisional areas BR1 through BR5 in sector form. The region division means 191 has a function for generating a division clock signals $BR_{CLK}$, the period of which is 1/M of the period of the rotation clock signal $R_{CLK}$ as illustrated in FIG. 15. Further, the region division means 191 has a function for dividing, based on the generated division clock signals $BR_{CLK}$, the interference signals IS stored in the interference signal storage means 92 into groups for the respective divisional areas BR, as illustrated in FIG. 15.

The aforementioned number M of the divisional areas BR may be set in advance. Alternatively, the number M may be set based on an instruction input at an input means, such as a mouse or a keyboard. Further, the sizes of the divisional areas BR may be either substantially uniform or different from each other. Further, when some of the divisional areas BR are the thinning regions CR, the interference signal thinning means 94 thins the interference signals IS in the divisional areas BR and stores the interference signals IS after thinning in the interference signal storage means 92.

Meanwhile, the interference signal obtainment means 101 obtains the interference signals IS stored in the interference signal storage means 92 for each of the divisional areas BR. The tomographic information obtainment means 103 obtains the light intensity information $r(z)$ from each of the interference signals IS positioned in the divisional area BR. The tomographic image production means 105 updates, based on the newly-obtained light intensity information $r(z)$, the sector-shaped divisional area BR in the tomographic image P that has been obtained already. For example, when a single tomographic image P has been divided into five divisional areas BR1 through BR5 (please refer to FIG. 14), tomographic images of sector-shaped divisional areas are produced. The sector-shaped divisional areas have central angles of 72° and the origins are the output timing positions of the division clock signals $BR_{CLK}$. Further, the tomographic image production means 105 updates a portion of the tomographic image P that has been already produced, the portion corresponding to the newly-produced divisional tomographic image BP portion.

As described above, processing time that is required to update the light intensity information r(z) about the divisional area BR within the tomographic image P can be reduced to approximately 1/10 of the processing time required in the conventional method in which the entire tomographic image P is updated. Further, time required to divide and update a single tomographic image P is approximately 1/2 of the time required to update the entire area of the single tomographic image P without dividing.

Here, when the tomographic image processing means 100 updates the divisional area BR within the tomographic image P, the interference signal obtainment means 101 obtains the interference signal IS detected by the interference light detection means 70 after the tomographic image is updated. Further, the interference signal obtainment means 101 updates the divisional area BR in the tomographic image P. In other words, the tomographic image P is neither produced nor updated based on the interference signals IS that are obtained in a period after obtainment of the interference signals IS for one divisional area BR to completion of the update of the tomographic image P.

Specifically, as illustrated in FIG. 15, the region division means 191 stores, based on the output timing of the divisional clock signals $BR_{CLK}$, identification flags (high level signals) for identifying the interference signals IS that are used to update the tomographic image P in the interference signal storage means 92 in such a manner that the identification flags relate to the interference signals IS. Further, the interference signal obtainment means 101 obtains the interference signals IS to which the identification flags are set. Specifically, in FIG. 14, identification flags are not set to the interference signals IS in the divisional areas BR2 through BR4 until obtainment of the light intensity information r(z) and update of the tomographic image p with respect to the interference signals IS in the divisional area BR1 are completed. Meanwhile, after update of the tomographic image P with respect to the divisional area BR1 is completed, an identification flag is set to the interference signal IS in the divisional area BR5, which has been detected by the interference light detection means 70. Further, obtainment of the light intensity information r(z) and update of the tomographic image P are performed based on the interference signals IS in the divisional area BR5. Then, after the update of the tomographic image P in the divisional area BR5 is completed, an identification flag is set to the interference signal IS in the divisional area BR4, which has been detected by the interference light detection means 70. The tomographic image P is updated by repeating the processing as described above.

As described above, after the tomographic image P is updated, the update of the tomographic image P based on the interference signals IS in the divisional areas BR, which have been detected by the interference light detection means 70, is repeated. Therefore, the tomographic image P is updated based on the latest (newest) interference signals IS detected by the interference light detection means 70. Hence, it is possible to constantly display the latest tomographic image P.

Especially, when division clock signals $BR_{CLK}$, which are obtained by dividing a rotation clock signal $R_{CLK}$ into M (for example, five), are output, if tomographic image processing is finished before the divisional clock signals $BR_{CLK}$ for M−2 clocks (for example, three clocks) are output (please refer to FIG. 15), divisional areas BR that are adjacent counterclockwise thereto are updated. Therefore, when the image is updated, it is possible to obtain a natural motion image.

Here, the method for updating the tomographic image P is not limited to the aforementioned method. The tomographic image P in the divisional area BR may be updated according to the order of obtainment of the interference signals IS. At this time, the interference signal obtainment means 101 obtains, based on the output timing of the divisional clock signals $BR_{CLK}$, a plurality of interference signals IS within the divisional area BR stored in the interference signal storage means 92.

FIG. 14 illustrates a case in which update is repeated with respect to the entire region of the tomographic image P, for example. Alternatively, update only for a specific divisional area BR may be repeated. Specifically, the region division means 191 has a function for specifying a divisional area in which the tomographic image is updated by selecting the divisional area from the plurality of divisional areas BR. Further, the interference signal obtainment means 101 obtains the interference signals IS only for the divisional area BR to be updated, and the light intensity information obtainment means 103 obtains the light intensity information r(z). Further, the tomographic image production means 105 produces the tomographic image based only on the light intensity information r(z) for the divisional area BR, and updates the divisional area BR. Accordingly, update of the tomographic image only in the region of interest is repeated. Hence, it is possible to reduce the data processing amount, thereby improving the motion-image response characteristic.

According to each of the aforementioned embodiments, the light L, the wavelength of which has periodically swept, is output, and the output light L is divided into the measurement light L1 and the reference light L2. Further, the reflection light L3, which is reflected from the measurement target S when the measurement target S is irradiated with the measurement light L1 in such a manner to scan the measurement target S, and the reference light L2 are combined with each other. Further, the interference light L4 when the reflection light L3 and the reference light L2 are combined with each other is detected as an interference signal IS for each wavelength sweep. Further, a thinning region CR is set. In the thinning region CR, the interference signals detected in each wavelength sweep are thinned in such a manner that the remaining interference signals IS after thinning are used to produce the tomographic image P. A plurality of interference signals IS in the set thinning region CR are thinned so that the interference signals IS that are used to produce the tomographic image remain. Further, the light intensity information r(z) about the measurement target S in the thinning region CR is obtained based on the interference signals IS for the wavelength sweep that remain after thinning. The tomographic image P in the thinning region CR is produced based on the obtained light intensity information r(z). Therefore, signal processing is performed on the interference signals IS that remain after thinning. Hence, it is possible to reduce the data processing amount, thereby improving the motion-image response characteristic.

When the thinning region setting means 93 has a function for setting, as the thinning region CR, a specific region of the entire scan region, if thinning is performed for a region other than a region of interest, it is possible to improve the motion-image response characteristic. At the same time, it is possible to obtain a tomographic image that has a high image quality for the region of interest.

Further, if the region division means 191 that divides the region scanned with the measurement light L1 into a plurality of divisional areas BR with respect to the scan direction is further provided, as illustrated in FIG. 13, and if the tomographic information obtainment means obtains, based on a plurality of interference signals IS in each of the divisional areas BR set by the region division means 191, the light intensity information r(z) about the measurement target S for each of the divisional areas, and if the tomographic image production means 105 updates the tomographic image P based on the light intensity information r(z) about each of the divisional areas BR obtained by the tomographic information obtainment means 103, it is possible to reduce the data processing amount to update the display of the tomographic image P. Further, it is possible to improve the motion-image response characteristic.

Further, if the region division means 191 has a function for setting a divisional area for updating the tomographic image by selecting the divisional area from a plurality of divisional areas, and if the tomographic information obtainment means 103 obtains the light intensity information r(z) based only on the interference signals IS in the selected divisional area BR to be updated, and if the tomographic image production means 105 updates the tomographic image P based on the light intensity information r(z) about the selected divisional area, update of the tomographic image is repeated only for the region of interest. Hence, it is possible to reduce the data processing amount, thereby improving the motion-image response characteristic.

The embodiments of the present invention are not limited to the aforementioned embodiments. For example, in FIG. 7, a case in which the thinning region setting means 93 and the interference signal thinning means 94 are provided in the A/D conversion unit 90 is illustrated. Alternatively, the thinning region setting means 93 and the interference signal thinning means 94 may be provided in the tomographic image processing means 100. At this time, the interference signal thinning means 94 thins a plurality of interference signals IS for a single tomographic image, the interference signals being obtained from the A/D conversion unit by the interference signal obtainment means 101. Similarly, in FIG. 14, a case in which the region division means 191 is provided in the A/D conversion unit 90 is illustrated as an example. However, the region division means 191 may be provided in the tomographic image processing means 100.

Further, the rotation number of the optical probe 10 may be set to a number exceeding the performance of the tomographic image processing means 100, and a highly accurate tomographic image P may be produced, based on the interference signals IS stored in the interference signal database 95, in offline processing. Accordingly, it is possible to obtain a high-image-quality tomographic image P that has low motion artifact without changing the configuration, such as the interferometer 20 and the tomographic image processing means 100.

What is claimed is:

1. A system for producing a tomographic image by optical tomography, the system comprising:
a light source means for outputting light having a wavelength which is periodically swept;
a light division means for dividing the light output from the light source means into measurement light and reference light;
a light combination means for combining the reference light and reflection light that is reflected from a measurement target when the measurement target is irradiated with the measurement light output by the light division means, in such a manner as to scan the measurement target;
an interference light detection means for detecting as interference signals, interference light when the reflection light and the reference light are combined by the light combination means in each wavelength sweep;
a thinning region setting means for setting a thinning region in which the interference signals that have been obtained by the interference light detection means are thinned so that the interference signals that are used to produce the tomographic image remain;
an interference signal thinning means for thinning a plurality of interference signals obtained in the thinning region that has been set by the thinning region setting means;
a tomographic information obtainment means for obtaining light intensity information about the measurement target in the thinning region, based on the interference signals for the respective wavelength sweeps remaining after thinning by the interference signal thinning means; and
a tomographic image production means for producing the tomographic image in the thinning region based on the light intensity information that has been obtained by the tomographic information obtainment means, the system further comprising:
a periodic clock generation means for outputting a periodic clock signal when a wavelength for one period has been swept by the light source means, wherein the interference signal thinning means counts the number of clocks of periodic clock signals output from the periodic clock generation means and thins the interference signals by selecting the interference signal when the number of the clocks obtained by counting reaches a predetermined clock number.

2. A system for producing a tomographic image by optical tomography, the system comprising:
a light source means for outputting light having a wavelength which is periodically swept;
a light division means for dividing the light output from the light source means into measurement light and reference light;
a light combination means for combining the reference light and reflection light that is reflected from a measurement target when the measurement target is irradiated with the measurement light output by the light division means, in such a manner as to scan the measurement target;
an interference light detection means for detecting as interference signals, interference light when the reflection light and the reference light are combined by the light combination means in each wavelength sweep;
a thinning region setting means for setting a thinning region in which the interference signals that have been obtained by the interference light detection means are thinned so that the interference signals that are used to produce the tomographic image remain;
an interference signal thinning means for thinning a plurality of interference signals obtained in the thinning region that has been set by the thinning region setting means;
a tomographic information obtainment means for obtaining light intensity information about the measurement target in the thinning region, based on the interference signals for the respective wavelength sweeps remaining after thinning by the interference signal thinning means; and
a tomographic image production means for producing the tomographic image in the thinning region based on the light intensity information that has been obtained by the tomographic information obtainment means, the system further comprising:

a region division means for dividing a region that is scanned with the measurement light into a plurality of divisional areas with respect to the direction of the scan, wherein the tomographic information obtainment means obtains, based on a plurality of interference signals in the divisional areas that have been set by the region division means, the light intensity information for each of the divisional areas, and wherein the tomographic image production means updates the tomographic image based on the light intensity information for each of the divisional areas that has been obtained by the tomographic information obtainment means.

3. A system for producing a tomographic image by optical tomography, as defined in claim 2, the system further comprising:

a rotation clock generation means that outputs a rotation clock signal each time the measurement target is scanned once with the measurement light, wherein the region division means generates division clock signals that have periods of 1/M times (M is the number of the divisional areas) as long as the period of the rotation clock signal output from the rotation clock generation means, and divides, based on the division clock signals, the plurality of interference signals into groups for the respective divisional areas.

4. A system for producing a tomographic image by optical tomography, as defined in claim 2, wherein the region division means specifies a divisional area in which the tomographic image should be updated by selecting the divisional area from the plurality of divisional areas, and wherein the tomographic information obtainment means obtains the light intensity information based only on the interference signal in the specified divisional area, and wherein the tomographic image production means updates the tomographic image based only on the light intensity information about the divisional area to be updated.

* * * * *